UNITED STATES PATENT OFFICE.

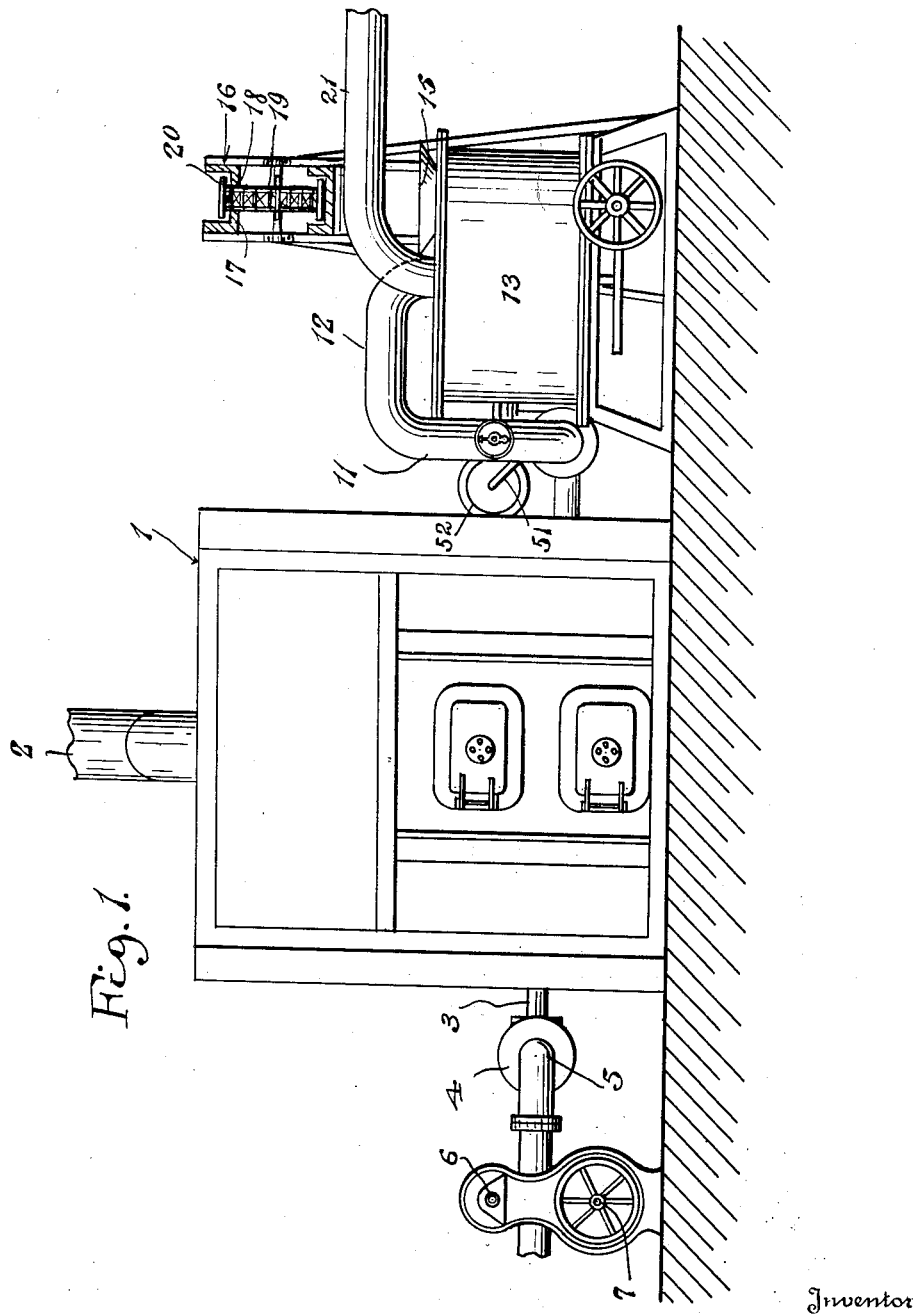

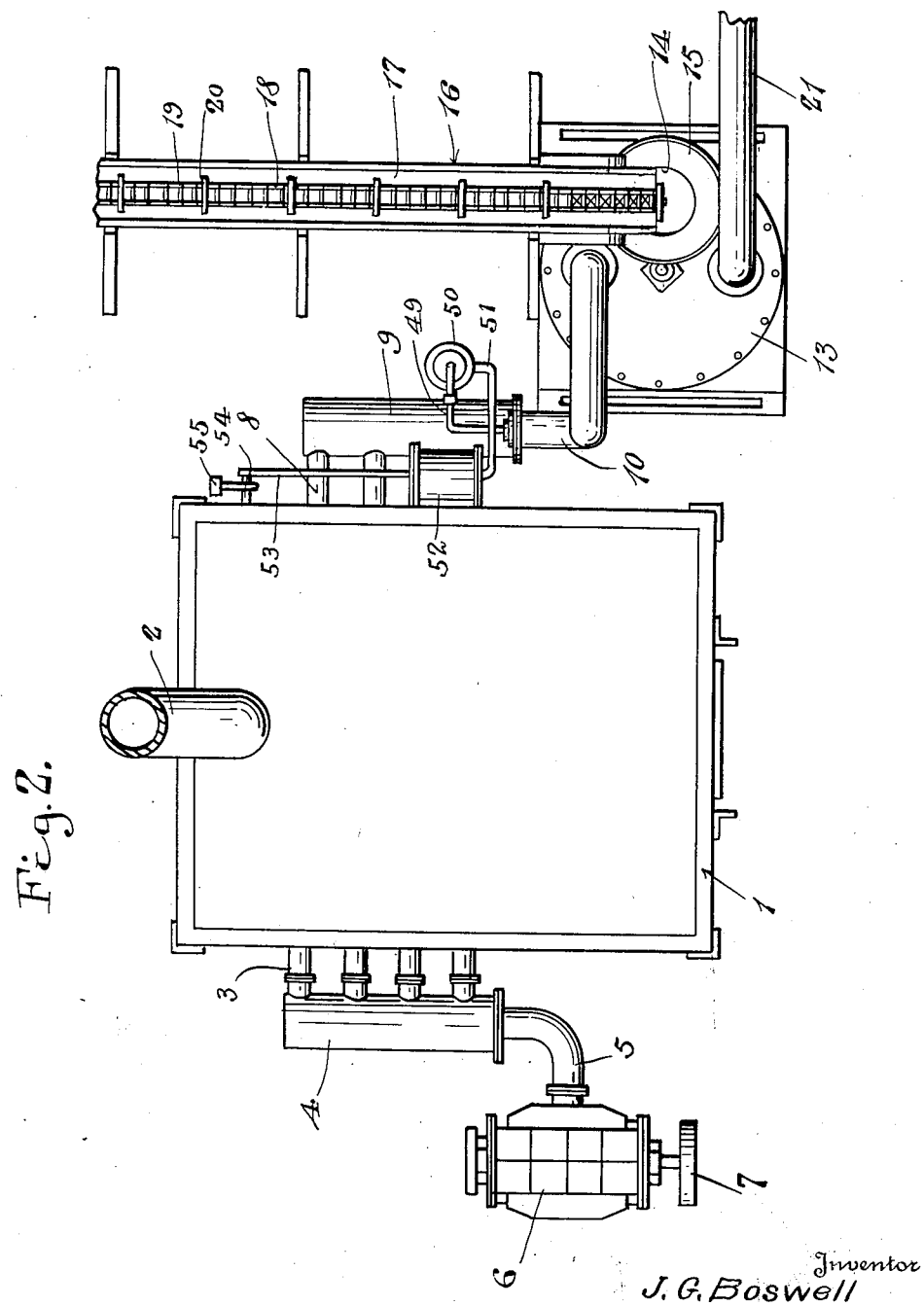

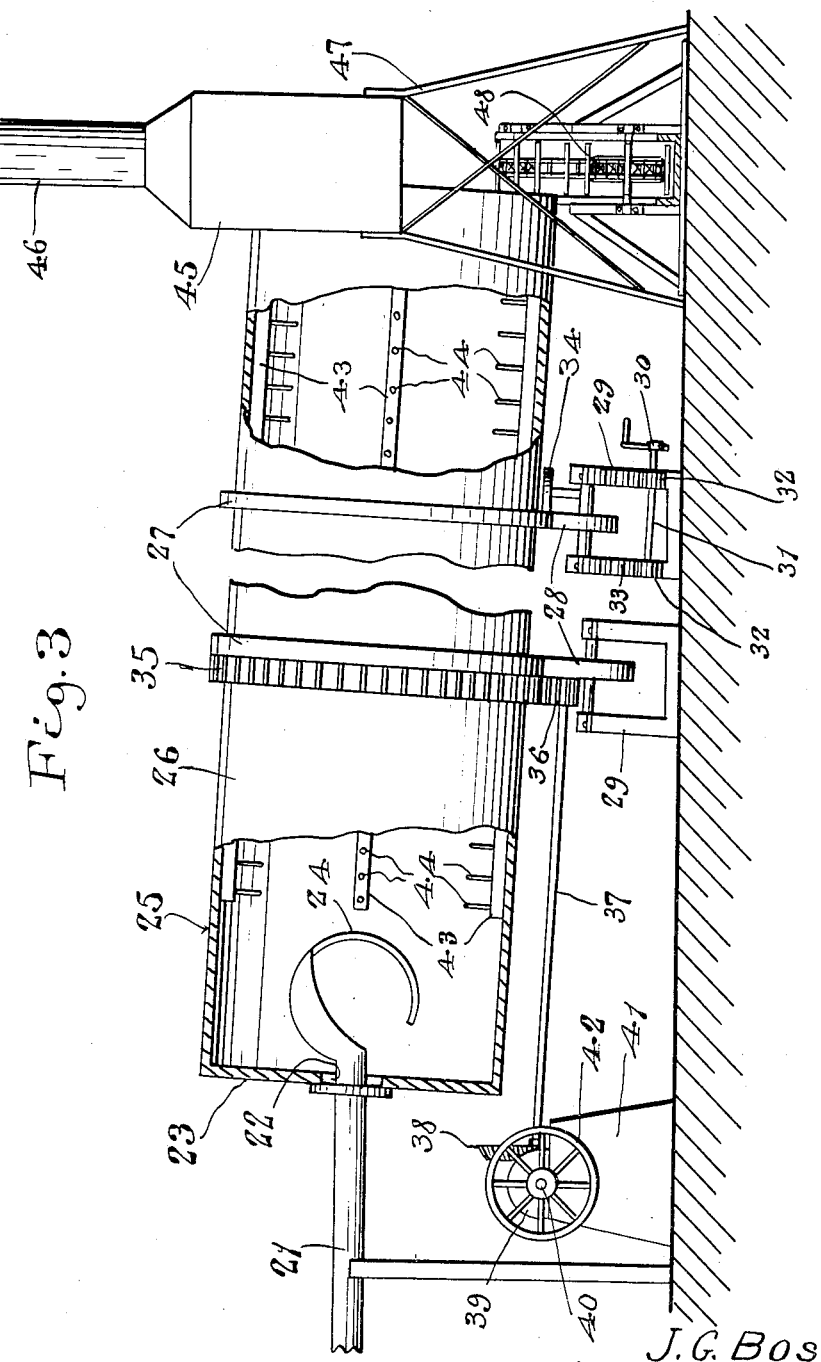

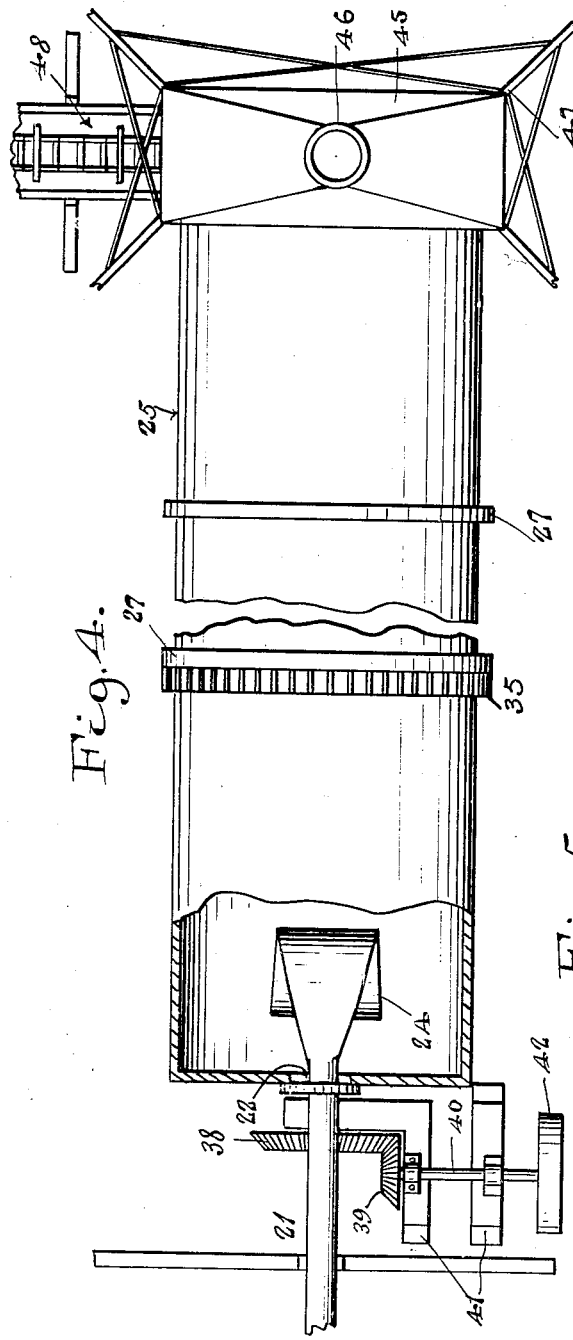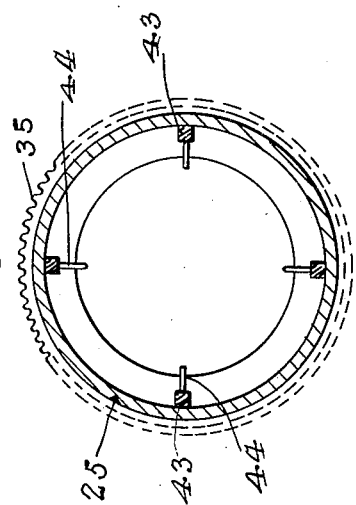

JAMES G. BOSWELL, OF PARADIS, LOUISIANA.

APPARATUS FOR DRYING HAY, GRAIN, OR THE LIKE.

1,370,513.     Specification of Letters Patent.     Patented Mar. 8, 1921.

Application filed April 4, 1918. Serial No. 226,699.

*To all whom it may concern:*

Be it known that I, JAMES G. BOSWELL, a citizen of the United States, residing at Paradis, in the parish of St. Charles and State of Louisiana, have invented certain new and useful Improvements in Apparatus for Drying Hay, Grain, or the like; and I do hereby declare the following to be a full, clear, and exact description of the invention, such as will enable others skilled in the art to which it appertains to make and use the same.

This invention relates to new and useful improvements in an apparatus and process for drying hay, grain and the like.

The principal object of the invention is to provide a drier which will effectively remove all of the moisture from the material at a minimum expense.

Another object of the invention is to provide a drier which is first arranged to pass a blast of air through a furnace and then carry the same into a charger where the grain is admitted to the air and carried through a suitable pipe into a drying drum or cylinder which is kept in continuous rotation and is provided at its end with an air outlet opening or hood which is arranged to conduct the warm air to the atmosphere and leave the grain free to be dumped onto a conveyer or any other suitable means by which the same is carried away from the device.

A still further object of the invention is to provide a means for controlling the speed of the passage of the material through the drum or cylinder which speed is controlled by the raising or lowering of the discharge end of the device.

With these and other objects in view the invention consists in the novel combination and arrangement of parts which will be fully set forth in the following specification and accompanying drawings, in which:—

Figure 1 is a front view in elevation of the furnace showing the charger connected thereto and illustrating the connecting of the blower or air pump to said furnace.

Fig. 2 is a top plan view of the same.

Fig. 3 is a fragmentary side elevation partly in section of the rotating drum or drying cylinder.

Fig. 4 is a top plan view of the same showing portions thereof in section to more clearly illustrate the details of construction, and Fig. 5 is a transverse sectional view through the device.

Referring to the drawings the numeral 1 designates as an entirety the furnace provided with the usual smoke pipe 2. This furnace is provided with a warm air chamber surrounding the fire box and connected to said chamber through one side wall of the furnace are a plurality of air inlet pipes 3 which are connected at their outer ends to a suitable header 4 which is connected by means of an elbow 5 with an air pump or blower designated by the numeral 6. This pump may be driven by any suitable means which is belted to the pulley 7. The outlet side of the furnace is provided with a plurality of pipes 8 the outer ends of which are connected to a suitable header 9 which in turn is connected by a pipe 10 with a vertical pipe 11 having its upper end connected to the horizontal pipe 12 which leads into the air intake side of the charger designated by the numeral 13 in which the air and grain are mixed prior to being passed through the drying drum or cylinder. This charger 13 is provided with a grain inlet opening 14 having a funnel 15 supported thereover in connection with which the conveyer designated generally by the numeral 16 operates. This conveyer 16 comprises a trough 17 formed with a central slot 18 in which the conveyer chain 19 runs. This conveyer chain has attached thereto a plurality of flights 20 which engage the upper side of the bottom wall of the trough so that any material in the trough will be carried along toward the opening 14. It will be understood that the conveyer chain at the end of the trough passes over a sprocket in any suitable manner.

After the air and material to be dried have entered the charger 13 they are passed outwardly from the outlet side of said charger through a pipe 21 which leads into the drying drum or cylinder which will be more fully hereinafter described.

The pipe 21 extends through an opening 22 in the end wall 23 of said drying drum or cylinder and is formed with a curved wall 24 forming a baffle which will prevent the air and grain from passing directly through the device.

The drying drum or cylinder is designated generally by the numeral 25 and comprises a cylindrical wall 26 having the end wall 23 closing one end thereof while the opposite end of said cylinder is left open. A pair of rings 27 are secured around the periphery of the cylinder or drum near opposite ends and form tracks which run against the supporting rolls 28 which are journaled in suitable frames 29 which form supports for the device. The frame 29 nearest the open end of the drum or cylinder is arranged to be adjusted vertically by means of the crank 30 which is mounted on a shaft 31 carrying a pair of pinions 32 which are arranged to mesh with the rack bars 33 carried by the upper portion of the rearward frame 29 so that upon turning the crank 30 the rearward end of the drying drum or cylinder may be raised or lowered in order that the feed of the grain through the device may be varied to meet various requirements. A suitable horizontally disposed thrust wheel 34 is journaled in the rearward frame 29 and is adapted to engage the rear ring 27 to form a thrust bearing for the drum.

In order to drive or rotate the drum or cylinder a suitable ring gear 35 surrounds the same immediately adjacent the front ring 27 and this gear 35 meshes with a pinion 36 mounted on the rear end of the shaft 37, the forward end of which is provided with a bevel gear 38 for meshing engagement with a bevel gear 39 mounted on a drive shaft 40 which in turn is mounted on a suitable pillar 41. A suitable belt wheel 42 is mounted on the end of the shaft 40 and it will be seen that when said belt wheel is driven the drum or cylinder will be rotated.

In order to provide a means for agitating the material within the cylinder or drum a plurality of longitudinally extending spaced parallel bars 43 are secured to the inner face of the cylindrical wall 26 of said drum and these bars are provided with a plurality of inwardly extending spikes 44 which engage and agitate the contents of the drum during its rotation. It will thus be seen that a portion of the material will be carried upwardly during the rotation of the drum and will be allowed to fall through the heated air thereby allowing the air to take up all of the moisture from the grain or other material and insuring the proper and complete drying of the material.

In order to conduct the warm air away from the device after the material has been passed through the drum a suitable hood 45 is provided and partially seats over the open end of said drum and a pipe 46 leads from the hood to a chimney or stack where the air is passed to the atmosphere. This hood 45 is supported on a suitable supporting structure 47 as clearly shown in the drawings.

In order to provide a means for removing the grain or other material after the same has passed through the drier a suitable conveyer designated generally by the numeral 48 is provided and is constructed in a manner similar to the conveyer 16 hereinbefore described and it will thus be seen that when the device is in operation the conveyer 48 will carry the material to the desired point.

What is claimed is:—

In a drying apparatus, a drum journaled for rotation, a pipe passing through the end of the drum and provided with a discharge nozzle located interiorly of the drum, the said nozzle being provided with a curved section disposed transversely across the outlet end of the pipe and spaced therefrom and adapted to spread solid material which emerges from the pipe and adapted to permit the air which is used as a vehicle for conveying the solid material through the pipe to escape from the material and over the same between the discharge end of the pipe and the said section.

In testimony whereof I affix my signature in presence of two witnesses.

JAMES G. BOSWELL.

Witnesses:
  PAUL L. HAWKINS,
  FRED RITIE.